United States Patent
Silvestri et al.

(10) Patent No.: US 11,237,375 B2
(45) Date of Patent: Feb. 1, 2022

(54) SYSTEM AND METHOD FOR MEASURING THE FOCUS STATE OF AN OPTICAL INSTRUMENT

(71) Applicants: LABORATORIO EUROPEO DI SPETTROSCOPIE NON LINEARI (LENS), Sesto Fiorentino (IT); CONSIGLIO NAZIONALE DELLE RICERCHE—CNR, Rome (IT); UNIVERSITA' DEGLI STUDI DI FIRENZE, Florence (IT)

(72) Inventors: Ludovico Silvestri, Sesto Fiorentino (IT); Marie Caroline Mullenbroich, Sesto Fiorentino (IT); Leonardo Sacconi, Sesto Fiorentino (IT); Francesco Saverio Pavone, Florence (IT)

(73) Assignees: LABORATORIO EUROPEO DI SPETTROSCOPIE NON LINEARI (LENS), Sesto Fiorentino (IT); CONSIGLIO NAZIONALE DELLE RICERCHE-CNR, Rome (IT)

( * ) Notice: Subject to any disclaimer, the term of this patent is extended or adjusted under 35 U.S.C. 154(b) by 259 days.

(21) Appl. No.: 16/473,952

(22) PCT Filed: Dec. 21, 2017

(86) PCT No.: PCT/EP2017/084057
§ 371 (c)(1),
(2) Date: Jun. 26, 2019

(87) PCT Pub. No.: WO2018/122093
PCT Pub. Date: Jul. 5, 2018

(65) Prior Publication Data
US 2019/0339504 A1    Nov. 7, 2019

(30) Foreign Application Priority Data

Dec. 30, 2016 (IT) .................. 102016000132604

(51) Int. Cl.
 *G02B 21/24* (2006.01)
 *G02B 7/34* (2021.01)
 *G02B 7/36* (2021.01)

(52) U.S. Cl.
 CPC ........... *G02B 21/244* (2013.01); *G02B 7/343* (2013.01); *G02B 7/36* (2013.01)

(58) Field of Classification Search
 CPC ........ G02B 21/244; G02B 7/343; G02B 7/36; G02B 21/245
 See application file for complete search history.

(56) References Cited

U.S. PATENT DOCUMENTS

| 4,634,255 A | 1/1987 | Suda et al. |
| 5,170,202 A | 12/1992 | Bell |

(Continued)

FOREIGN PATENT DOCUMENTS

| JP | 8-201680 A | 8/1996 |
| JP | 9-80301 A | 3/1997 |
| JP | 11-167060 | 6/1999 |

OTHER PUBLICATIONS

International Search Report dated Mar. 22, 2018 in PCT/EP2017/084057 filed Dec. 21, 2017.

(Continued)

*Primary Examiner* — Robert E. Tallman
(74) *Attorney, Agent, or Firm* — Oblon, McClelland, Maier & Neustadt, L.L.P.

(57) ABSTRACT

A system and a method for measuring the focus state of an optical instrument are described. The system and the method provide for forming an image of the exit pupil of the objective of the optical instrument. Where the image of the (Continued)

exit pupil is formed, one or more optical elements are placed, deviating at least part of the rays coming from the exit pupil, so that rays coming from different non-overlapping portions of the pupil follow separate optical paths. The rays coming from the two portions of the pupil are then focused, in order to obtain two bidimensional images. A computer determines the mutual distance between these two bidimensional images as a mutual rigid lateral displacement between the two and, based on this distance, determines the corresponding defocus of the optical instrument.

8 Claims, 5 Drawing Sheets

(56) References Cited

U.S. PATENT DOCUMENTS

| | | | |
|---|---|---|---|
| 5,790,710 A | 8/1998 | Price et al. | |
| 2006/0256229 A1 | 11/2006 | Wernersson | |
| 2011/0063484 A1 | 3/2011 | Fujii et al. | |
| 2012/0206590 A1* | 8/2012 | Yamamoto | G02B 7/34 348/79 |

OTHER PUBLICATIONS

Sicairos, M. G., "Efficient subpixel image registration by cross-correlation," https://nl.mathworks.com/mathlabcentral/mlc-downloads/downloads/submissions/18401/versions/4/previews/html/efficient_subpixel_registration.html?access_key=, Jun. 16, 2016, [retrieved on Sep. 19, 2017], 4 pages, XP055407860.

* cited by examiner

SYSTEM AND METHOD FOR MEASURING THE FOCUS STATE OF AN OPTICAL INSTRUMENT

CROSS REFERENCE TO RELATED APPLICATION

This application is a national phase application of PCT/EP2017/084057, filed Dec. 21, 2017, which claims priority to Italian Patent Application No. 102016000132604, filed Dec. 30, 2016, the entire content and disclosure of each of which is incorporated into the present application.

The project that led to the present patent application was financed by the European Union in the context of the Horizon 2020 Research and Innovation Program (grant agreement No. 720270—Human Brain Project) and in the context of the ESFRI Euro-BioImaging Infrastructural Project. Finally, the project received funding from the Ministry of Education, University and Research as part of the NanoMAX flag project.

TECHNICAL FIELD

The present invention relates to a system and a method for measuring the focus state of an optical instrument, for example (although not exclusively) an optical microscope.

BACKGROUND ART

It is well known that a compound optical microscope comprises a tube lens and an objective. The objective usually comprises a first system of lenses placed in proximity of the sample to be analyzed, whereas the tube lens comprises a second system of lenses placed in proximity of the observation point. The objective collects the light coming from the sample, and said light is then focused by the tube lens to create a magnified image of the sample.

The magnified image of the sample is said to be "focused" or 'in focus' when the light emitted from the different points in the sample converges as much as possible in the magnified image, as it occurs when the sample is substantially placed in the focal plane of the objective. The more the sample is positioned far away from the objective focal plane, the less the magnified image of the sample results in focus.

The focus state of the magnified image thus depends on the distance between the objective and the sample along the optical axis, and is therefore usually regulated and optimized by changing said distance, moving along the optical axis the objective and/or the sample.

U.S. Pat. No. 5,790,710 describes an autofocus system for scanning microscopy, which acquires different images of the sample in different conditions of field depth, and then applies thereto a contrast measure function. An actuator regulates the sample position as a function of the obtained contrast measurement.

US 2006/0256229 describes an autofocus system based on triangulation, which comprises an emitter projecting a light beam onto a point on the sample. The system comprises also a photodetector collecting an image of the light beam reflected by the sample, and evaluates it automatically to determine the distance between lens and sample.

U.S. Pat. No. 4,634,255 describes an apparatus to measure the focus state, comprising a field lens placed on or in front of the imaging plane of an imaging lens. Light rays transmitted through the imaging lens and the field lens are vertically split into two portions by a prism. Each portion of rays passes through a diaphragm with two apertures, and is then directed onto a converging lens, which converges them so to form two images onto two linear photodetectors arrays. The focus state is then measured processing the output signals of the two linear photodetectors arrays.

US 2011/0063484 describes an image acquisition system capable of detecting its focus state, comprising an image acquisition device, a central element of said device comprising at least a couple of left and right pixels. Each pixel is formed by a photodiode, over each photodiode a couple of masks defining a slit, and a microlens being placed. The pixel couple thus divides the light rays coming from a right portion and a left portion of the exit pupil, and focuses them onto the two photodiodes. The larger the distance between the image obtained from the right pixels of each couple and the image obtained from the left pixels of each couple, the larger the defocus of the magnified image.

US 2012/0206590 describes a microscope with an autofocus system, comprising an objective, a beam splitter, a field lens, a mask, two splitting lenses, a bidimensional photodetector array and a processor. The beam splitter deviates part of the light coming from the objective onto the field lens, which concentrates the light rays onto the mask. The mask has two apertures dividing the rays into two parts, which are focused by the two splitting lens onto the surface of the photodetector array, where two copies of the magnified image are thus formed. For each pixel of one copy, the processor finds the corresponding pixels in the other copy and measures the distance between them, obtaining in this way the defocus pixel by pixel.

SUMMARY OF THE INVENTION

The inventors noticed that the known autofocus systems above described presents several disadvantages.

As to the system described by U.S. Pat. No. 5,170,202, it requires the acquisition of several images to determine the optimal position of the movable lens. However, the acquisition of several images disadvantageously introduces a delay in the determination of the optimal position of the movable lens, slowing down the entire functioning of the apparatus using such system.

As to the system described by US 2006/0256229, it is based on the light reflected by the sample, and therefore, disadvantageously, it does not work when the sample reflects the light too faintly or does not reflect at all, or when the reflection plane does not coincides with the sample position. For example, if the sample is immersed in a liquid or in a gel, the reflection occurs at the interface between the liquid (or the gel) and the air. However, since the sample is placed at an unknown position inside the liquid (or the gel), from the measurement of the position of the air-liquid (or air-gel) interface it is not possible to infer the position of the sample.

As to the systems described by U.S. Pat. No. 4,634,255, US 2011/0063484 and US 2012/0206590, the inventors observed that they substantially involve the splitting of the rays coming from two different portions of the exit pupil of the objective, and their subsequent focusing in order to create two distinct images, one translated with respect to the other. When the focus state changes, so does the lateral distance between these two images. These known systems thus allow measuring the focus state substantially in real time, since they do not require the acquisition of several images of the sample. Furthermore, these systems are only based on the processing of the image provided by the objective, thus avoiding the drawbacks resulting from the use of reflected light.

However, these systems present other drawbacks.

As to the system described in U.S. Pat. No. 4,634,255, it uses linear photodetector arrays. If the sample is not infinitely thin or not perfectly transparent, it may present refractive index variations along the path between the sample and the objective. Rays coming from the same point in the sample may then experience optical paths of different length. This phenomenon may introduce higher-order aberrations (for instance astigmatism, distortion, coma, field curvature, etc.), so that the two images obtained by separating and focusing the rays coming from two different portions of the exit pupil may be different from one another. Focus state measurements obtained by processing the signals provided by the two linear photodetector arrays may thus be not accurate and may lead to a non-optimal positioning of the objective. Furthermore, in low-light conditions, the measurement of the distance may be difficult because of the fluctuations introduced by background noise. Furthermore, when the image has a sparse content (i.e. when a large portion of the image pixels has no content, but only noise), there is a non-negligible chance that linear photodetectors array do not detect any salient feature of the image but only noise, making any measurement of the mutual distance impossible.

As to the system described by US 2011/0063484, it is disadvantageously poorly flexible, since changing the system parameters (e.g. changing the portions of the exit pupils to be used to evaluate the focus state), requires the physical replacement of the entire image acquisition system, an operation introducing non-negligible costs and technical complexities.

As to the system described by US 2012/0206590, it executes a local processing (pixel by pixel) of the two images obtained from the separation of the rays passing through two different portions of the exit pupil of the objective. It thus presents substantially the same drawbacks of the system described by U.S. Pat. No. 4,634,255.

The object of the present invention is therefore to provide a system and a method for measuring the focus state of an optical instrument (in particular, but not exclusively, an optical microscope) which solve the above mentioned problems.

In particular, the object of the present invention is to provide a system and a method for measuring the focus state of an optical instrument (in particular, but not exclusively, an optical microscope) that is more robust with respect to the aberrations introduced by the sample, provides optimal focusing also in low-light conditions, is capable of operating also with sparse-content images, and is flexible, i.e. allows modification of the system parameters without requiring any physical modification of the system itself.

According to a first aspect, the present invention provides a system for measuring the focus state of an optical instrument, the system comprising:
- at least one first optical element configured to form an image of an exit pupil of an objective of the optical instrument;
- at least one second optical element placed substantially where the image of the exit pupil is formed and configured to deviate at least part of the rays coming from the exit pupil so that, downstream the image of the exit pupil, first rays coming from a first portion of the exit pupil and second rays coming from a second portion of the exit pupil follow separate optical paths, the first portion and the second portion of the exit pupil being non overlapping, and being then focused into two bidimensional images; and
- a computer configured to determine a mutual distance between the two bidimensional images as a mutual rigid lateral displacement between the two bidimensional images and, based on said mutual distance, to determine a corresponding defocus of the optical instrument.

Preferably, the at least one first optical element comprises a beam splitter positionable upstream the objective of the optical instrument, the beam splitter being configured to capture the light coming from the objective and deviate a portion thereof along an optical axis of the system.

Preferably, the at least one second optical element is configured to capture and deviate away from the optical axis of the system the first rays coming from the first portion of the exit pupil and/or the second rays coming from the second portion of the exit pupil.

Preferably, the at least one second optical element comprises at least one prism or at least one mirror placed substantially where the image of the exit pupil is formed.

According to a preferred embodiment, the at least one second optical element comprises also a mask placed substantially where the image of the exit pupil is formed, the mask comprising two apertures defining the first portion of the exit pupil from which the first rays come and the second portion of the exit pupil from which the second rays come.

Preferably, the computer is configured to apply to the two bidimensional images a global merit function, providing a measurement of their similarity, to determine the mutual distance as the mutual rigid lateral displacement between the two bidimensional images that maximizes the value of the global merit function.

Preferably, the global merit function comprises a bidimensional cross-correlation between the two bidimensional images or a mutual information function between the two bidimensional images.

Preferably, the computer is configured to compute at least two values of the mutual distance by applying at least two different global merit functions to the two bidimensional images, and to determine a unique value of the mutual distance by combining the at least two values.

Preferably, the computer is configured to determine the defocus of the optical instrument based on the mutual distance, by applying the inverse of an equation $Y(\Delta z)$ whose coefficients depend on optical properties of the optical instrument.

Preferably, the computer is configured to generate a command signal based on the determined defocus, the command signal comprising information for adjusting a mutual distance between the objective of the optical instrument and a sample analyzed by the optical instrument, to optimize the focus state of the optical instrument.

According to a second aspect, the present invention provides a method for measuring the focus state of an optical instrument, the method comprising:
- forming an image of an exit pupil of an objective of the optical instrument;
- deviating at least part of the rays coming from the exit pupil so that, downstream the image of the exit pupil, first rays coming from a first portion of the exit pupil and second rays coming from a second portion of the exit pupil follow separate optical paths, the first portion and the second portion of the exit pupil being non-overlapping, and being then focused into two bidimensional images, and
- determining a mutual distance between the two bidimensional images as a mutual rigid lateral displacement between the two bidimensional images and, based on the mutual distance, determining a corresponding defocus of the optical instrument.

BRIEF DESCRIPTION OF THE DRAWINGS

The present invention will become clear from the following detailed description, given by way of example and not of limitation, to be read with reference to the accompanying drawings, wherein.

Annexed figures are not to scale.

DETAILED DESCRIPTION OF PREFERRED EMBODIMENTS OF THE INVENTION

Figure 1:
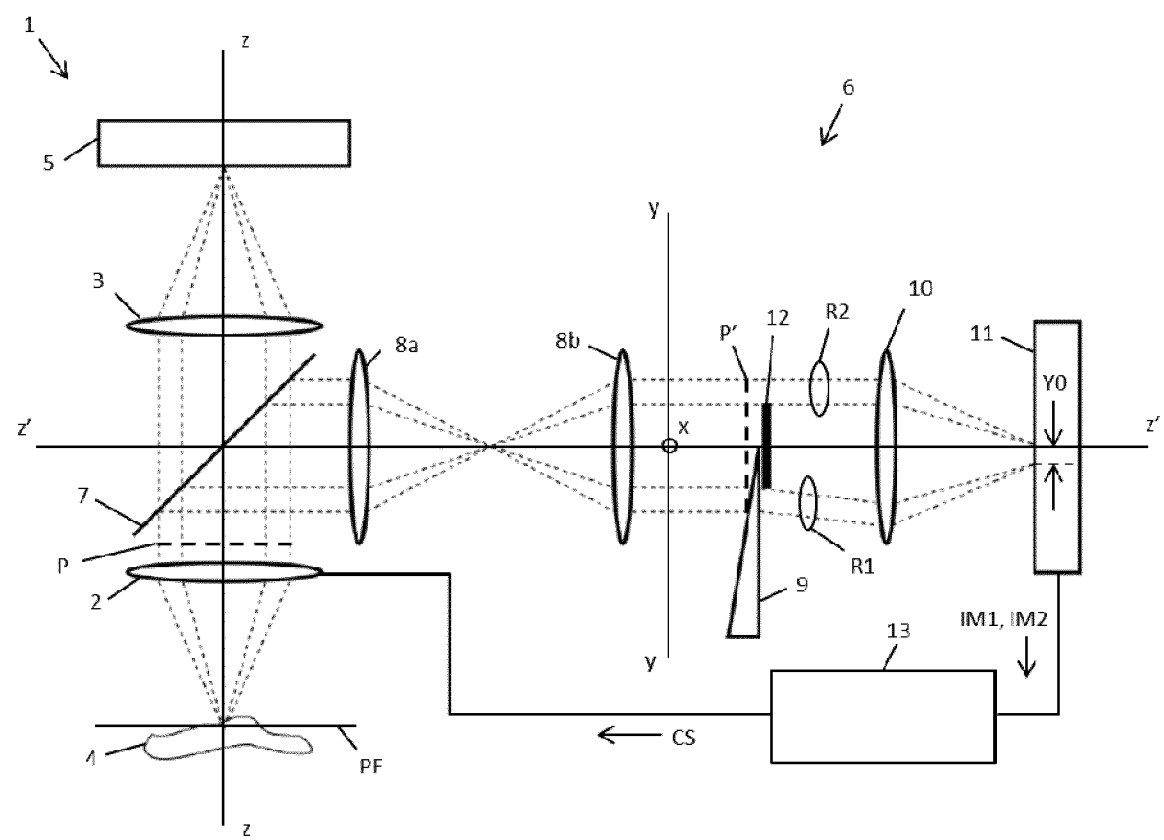
FIG. 1 schematically shows a system for measuring the focus state of an optical instrument, according to a first embodiment of the present invention.

FIG. 1 shows a system for measuring the focus state of an optical instrument, according to an embodiment of the present invention.

By way of example and not of limitation, the optical instrument is a compound optical microscope 1. The system may anyway be used to measure the focus state of other kinds of optical instruments, for example a photographic machine, a telescope, etc.

The optical microscope 1 comprises an objective 2 and a tube lens 3 aligned along an optical axis z. The objective 2 and the tube lens 3 comprise respective systems of lenses (not shown in detail in FIG. 1), each of which may comprise one or more lenses aligned along the optical axis z.

The optical microscope 1 further preferably comprises a photodetector 5. The photodetector 5 may be for instance a bidimensional array of photodiodes, or a bidimensional CCD sensor, or a bidimensional CMOS sensor.

The optical microscope 1 may be whatever microscope based on wide-field detection, for example a brightfield microscope, a darkfield microscope, a fluorescence (epi-fluorescence or trans-fluorescence) microscope, or a light-sheet microscope. The microscope 1 may further comprise other components, that are not shown in FIG. 1 and that will not be described since not useful for the purpose of the present description.

In the optical microscope 1, light coming from a sample 4 is collected by the objective 2 and focused by the tube lens 3, that in this way creates a magnified image of the sample 4. In particular, this magnified image is created by the tube lens 3 on the surface of the photodetector 5, which transforms the magnified image into a corresponding digital image. If the sample 4 is placed substantially on the focal plane FP of the objective 2 (as schematically shown in FIG. 1), the magnified image and the corresponding digital image are in focus.

In order to measure the focus state of the magnified image of the sample 4, the microscope 1 is equipped with a system for measuring the focus state 6.

According to a first embodiment of the present invention, the system 6 preferably comprises a beam splitter 7, one or more lenses (two lenses, by way of non limiting example) 8a, 8b, a prism 9, a second lens 10, a further photodetector 11 and a computer 13.

The beam splitter 7 is preferably placed upstream of the objective 2, for example between the objective 2 and the tube lens 3, as schematically shown by way of example in FIG. 1. The beam splitter 7 is preferably oriented 45° apart from the optical axis z, in order to capture the light coming from the objective 2 and deviate a fraction of said light along a second optical axis z'. The fraction of deviated light preferably amounts substantially to about 10% of the total light incident on the beam splitter 7. The optical axis z' preferably is substantially perpendicular to the optical axis z of the microscope 1.

The two first lenses 8a, 8b are preferably plano-convex or bi-convex lenses, placed on the optical axis z'. According to a preferred embodiment, the lens 8a is placed at a distance from the exit pupil P of the objective 2 (the projection of which is schematically shown in FIG. 1) equal to its focal length $f_a$, whereas the lens 8b is preferably placed at a distance from the lens 8a equal to the sum of their focal lengths $f_a+f_b$. In this way, the beam splitter 7 together with the two first lenses 8a, 8b forms an image P' of the exit pupil P of the objective 2 (the projection of which is schematically shown in FIG. 1), at a distance from the lens 8b equal to its focal length $f_b$.

The prism 9 is preferably placed downstream the two first lenses 8a, 8b, substantially in the plane where the image of the exit pupil P' of the objective 2 is formed, i.e. substantially at a distance $f_b$ from the lens 8b. The prism 9 is preferably configured to deviate the rays R1 coming from a first portion of the exit pupil P (and therefore of its image P') and to leave instead unhindered the rays R2 coming from a second portion of the exit pupil P (and therefore of its image P') spatially non-overlapping with the first portion of the exit pupil P.

In detail, if x and y indicate two mutually orthogonal directions perpendicular to the optical axis z' (schematically shown in FIG. 1), the prism 9 is preferably configured to deviate the rays R1 coming from a first portion of the exit pupil P whose image P' is located in one of the two half-spaces delimited by the plane defined by the z' axis and, for instance, the x direction, and to leave instead unhindered the rays R2 coming from a second portion of the exit pupil P whose image P' is located in the other half-space delimited by the plane defined by z' and x.

For example, the prism 9 may be entirely placed in the half-space where the image of the first pupil portion, from where the rays R1 come, is located, as shown in FIG. 1. In this way, the rays R1 are deviated in the plane defined by the optical axis z' and the orthogonal direction y, away from the optical axis z'.

Optionally, the system for measuring the focus state 6 may be equipped also with a mask 12. Also the mask 12 is preferably placed substantially on the plane where the image of the exit pupil P', created by the lenses 8a and 8b, lies. In particular, the mask 12 may be placed immediately after the prism 9 (as schematically shown in FIG. 1) or immediately before the prism 9. The mask 12 is preferably shaped to define the two non-overlapping portions of the exit pupil P, from which the rays R1 deviated by prism 9 and the rays R2 not deviated by prism 9 come. For example, in the configuration shown in FIG. 1, the mask 12 is a diaphragm with two apertures, one located in the first half-space defined by the optical axis z' and the direction x, and the other located in the other half-space defined by the optical axis z' and the direction x. Each aperture may have, for example, the shape of a circular segment.

The area of each aperture of the mask 12 is preferably equal at least to the 5% of the area of the exit pupil P (and of its image P'), more preferably is equal at least to the 10%, even more preferably is equal at least to the 20%. In this way, the system 6 is advantageously capable of averaging over a significant portion of the higher-order aberrations. This allows obtaining a measurement of the focus state more robust against these higher-order aberrations, as will be discussed in more detail herein after.

As mentioned above, the mask 12 is optional. In absence of the mask, the two portions of the exit pupil P considered by the measurement system 6 correspond to the two halves of the whole exit pupil P and of its image P', i.e. the half of the image P' located in the first half-space defined by the optical axis z' and by the direction x, and the half of the image P' located in the other half-space defined by the optical axis z' and the direction x.

The second lens 10 of the measurement system 6 is preferably placed downstream the prism 9 (and the mask 12, if present), along the optical axis z'. The lens 10 is for example a plano-convex or bi-convex lens. It is preferably placed at a distance from the plane where the lenses 8a and 8b form the image of the pupil P' equal to its focal length $f_{10}$.

The photodetector 11 is placed downstream the second lens 10, preferably at a distance equal to the focal length $f_{10}$ of the lens 10. The photodetector 11 preferably comprises a bidimensional matrix of photodiodes, or a bidimensional CCD sensor, or a bidimensional CMOS sensor.

The second lens 10 preferably receives both the deviated rays R1 coming from the first portion of the pupil P through the prism 9, and the not deviated rays R2 coming from the second portion of the pupil P. The rays R1 are focused by the lens 10 onto the surface of the photodetector 11 to form a first image IM1 of the sample 4, whereas the rays R2 are focused by the lens 10 onto the surface of the photodetector 11 to form a second image IM2 of the sample 4.

The FIG. 1 shows the situation when the focus state is optimized, i.e. when the sample 4 is placed substantially in the focal plane FP of the objective 2. In this situation, it may be observed that the rays R1 coming from the sample 4 across the first portion of the pupil P produce a first image IM1 of the sample 4, whereas the rays R2 coming from the sample 4 across the second portion of the pupil P create an image IM2 of the sample 4 translated with respect to the first image IM1 along the direction y. In particular, the first image IM1 and the second image IM2 are placed at a mutual distance Y0.

When the focus state of the microscope 1 changes (i.e. when the distance between the sample 4 and the focal plane FP of the objective 2 changes), the distance Y changes from the optimal value Y0. In particular, the mutual distance Y between the images IM1 and IM2 changes with the focus state according to the following equation:

$$Y(\Delta z) = Y0 - 2 \cdot G \cdot NA \cdot Mr \cdot \Delta z \quad [1]$$

where G is a geometric factor with value between 0 and 1 that takes into account the shape of the two portions of the pupil used to generate the images IM1 and IM2, NA is the numerical aperture of the objective 2 and Mr is the effective magnification of the images on the surface of the photodetector 11. The term $\Delta z$ is the defocus, i.e. the difference between (i) the distance between objective 2 and sample 4 and (ii) the distance between the objective 2 and the focal plane FP. Defocus is then positive when $\Delta z > 0$, i.e. the sample 4 is further away from the objective 2 than the focal plane FP, whereas defocus is negative when $\Delta z < 0$, i.e. the sample 4 is closer to the objective 2 than the focal plane FP.

Figure 2:
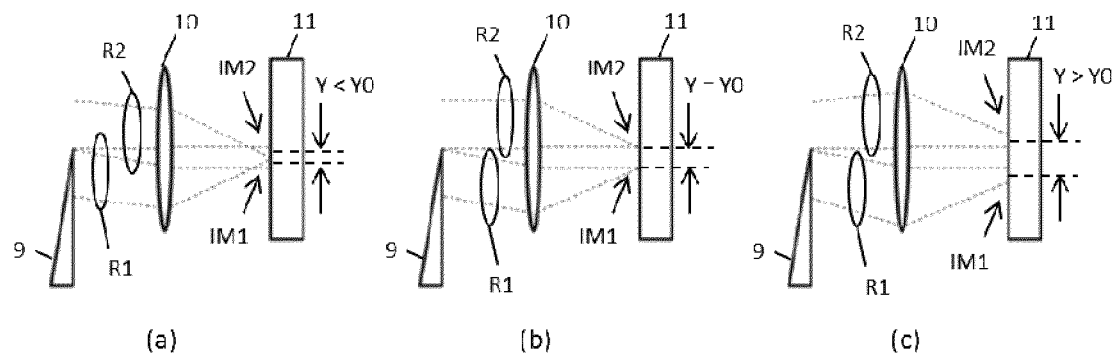
FIG. 2 shows with higher detail a portion of the system in FIG. 1, corresponding to different defocuses.

FIG. 2 schematically shows how the distance Y changes when the defocus $\Delta z$ changes, in the case that the mask 12 is not present.

In detail, FIG. 2(*b*) shows the in-focus situation, i.e. $\Delta z = 0$. In this situation, the mutual distance between the two images IM1 and IM2 is Y=Y0. Furthermore, the rays R1 entering the lens 10 are parallel, and the rays R2 entering the lens 10 are parallel, resulting in well-focused images IM1 and IM2.

FIG. 2(*a*) instead shows a situation of positive defocus, i.e. $\Delta z > 0$. In this situation, the mutual distance between the two images IM1 and IM2 is Y<Y0. Furthermore, the rays R1 entering the lens 10 are convergent, and the rays R2 entering the lens 10 are convergent, resulting in imperfect focusing of the images IM1 and IM2.

Finally, FIG. 2(*c*) shows a situation of negative defocus, i.e. $\Delta z < 0$. In this situation, the mutual distance between the two images IM1 and IM2 is Y>Y0. Furthermore, the rays R1 entering the lens 10 are divergent, and the rays R2 entering the lens 10 are divergent, resulting in imperfect focusing of the images IM1 and IM2—analogously to the previous case.

Figure 3:
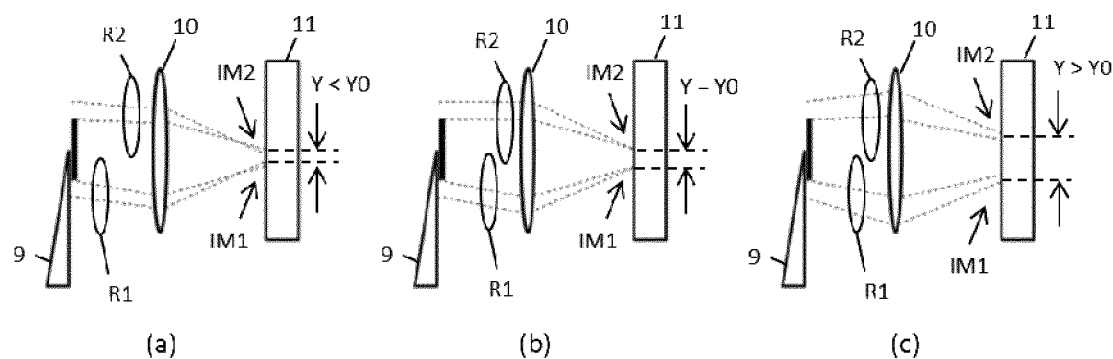
FIG. 3 shows with higher detail a portion of the system in FIG. 1, corresponding to different defocuses and in presence of a mask.

FIG. 3 schematically shows how the distance Y changes when the focus state of the microscope 1 changes, in case the mask 12 is present.

In detail, FIG. 3(*b*) shows the in-focus situation, i.e. $\Delta z = 0$. In this situation, the mutual distance between the two images IM1 and IM2 is Y=Y0. Furthermore, also in presence of the mask 12, the rays R1 entering the lens 10 are parallel, and the rays R2 entering the lens 10 are parallel, resulting in well-focused images IM1 and IM2.

FIG. 3(*a*) instead shows a situation of positive defocus, i.e. $\Delta z > 0$. In this situation, similarly to the case without the mask described above, the mutual distance between the two images IM1 and IM2 is Y<Y0. Furthermore, in presence of the mask, we notice that the rays R1 entering the lens 10 are slightly convergent, and the rays R2 entering the lens 10 are slightly convergent, resulting in slightly imperfect focusing of the images IM1 and IM2. Nevertheless, comparison with FIG. 2(*a*) shows that the presence of the mask 12 improves the focusing of the images IM1 and IM2, thanks to the resulting increase in the depth of focus.

Finally, FIG. 3(*c*) shows a situation of negative defocus, i.e. $\Delta z < 0$. In this situation, as for the case without the mask described above, the mutual distance between the two images IM1 and IM2 is Y>Y0. Furthermore, it may be noticed that, in the presence of the mask 12, the rays R1 entering the lens 10 are slightly divergent, and the rays R2 entering the lens 10 are slightly divergent, resulting in slightly imperfect focusing of the images IM1 and IM2. Nevertheless, comparison with FIG. 2(*c*) shows that the presence of the mask 12 improves the focusing of the images IM1 and IM2, thanks to the resulting increase in the depth of focus.

In general, thus, the presence of the mask 12, besides allowing a choice of the portions of the exit pupil P used to generate the images IM1 and IM2, advantageously results in an increased depth of field in the focus state measurement system 6, which in turn results in a higher sharpness of the images IM1 and IM2. This is advantageous because it improves the accuracy in the measurement of the mutual distance Y between the two images.

On the other hand, it should be noted that the mask 12 reduces the luminosity of the images IM1 and IM2, and thus reduces the signal to noise ratio. In low-light conditions, the signal to noise ratio might become too low to allow an accurate measurement of the mutual distance Y between the images IM1 and IM2. Therefore, the optional choice of using the mask 12 is preferably made considering luminosity conditions.

With reference again to FIG. 1, the bidimensional images IM1 and IM2 formed on the surface of the photodetector 11 are converted in digital format by the photodetector itself, and sent to the computer 13.

The computer 13 is preferably configured to process the images IM1 and IM2, in order to measure their mutual distance Y.

According to preferred embodiments, the computer 13 optionally executes a pre-processing of the images IM1 and IM2 previously to the computation of the mutual distance Y. In this pre-processing phase, the computer 13 preferably processes the images IM1 and IM2 in order to increase their contrast. To this aim, the computer 13 may for example identify in the images IM1 and IM2 the pixels with a luminosity higher than a predefined threshold (expressed for example in relation to a percentile of the histogram of the luminosity values of the pixels in the image) and put to zero the value of those pixels whose luminosity is lower than the predefined threshold. Alternatively, the computer 13 may use known methods of edge contrast enhancement based on the convolution with Gaussian kernels of different sizes.

Once the optional pre-processing phase is finished, the computer 13 proceeds to the computation of the mutual distance Y between the two images IM1 and IM2.

Preferably, to this aim the computer 13 executes an algorithm of mutual rigid lateral displacement of bidimensional images. In detail, such algorithm applies to the images IM1 and IM2 a global merit function, providing a measurement of their similarity, and determines the mutual distance Y between the images IM1 and IM2 as the mutual lateral rigid displacement (along direction y) between the images IM1 and IM2 maximizing the value of the global merit function.

For example, the global merit function may be a bidimensional cross-correlation between the bidimensional images IM1 and IM2. In this case, the computer 13 preferably computes the normalized cross-correlation between the images IM1 and IM2 according to the following equation:

$$CCN(y') = \frac{1}{N} \sum_{x,y} \frac{(IM1(x,y) - IM1_{av}) \cdot (IM2(x, y+y') - IM2_{av})}{SDIM1 \cdot SDIM2} \quad [2]$$

where y' is the mutual rigid lateral displacement between the images IM1 and IM2, N is the total number of pixels in each image IM1 and IM2, IM1(x,y) is the value of pixel (x,y) in the image IM1, IM2(x,y) is the value of the pixel (x,y) in image IM2, $IM1_{av}$ is the average value of all pixels in the image IM1, $IM2_{av}$ is the average value of all pixels in the image IM2, SDIM1 is the standard deviation of the pixels in the image IM1 and SDIM2 is the standard deviation of the pixels in the image IM2.

The computer 13 preferably computes the value of CCN for different values of the mutual rigid lateral displacement y' between the images IM1 and IM2, and finds Y as the mutual rigid lateral displacement y' that provides the maximum value of CCN.

Alternatively, the global merit function may be a mutual information function between the images IM1 and IM2, defined as:

$$MI(y') = \sum_{a,b} p(a,b) \cdot \log \frac{p(a,b)}{p(a) \cdot p(b)} \quad [3]$$

where p(a,b) is the probability of having the value a in a generic pixel (x,y) in the image IM1 and the value b in the corresponding pixel (x,y+y') in the image IM2, p(a) is the probability of having the value a for a generic pixel in the image IM1 and p(b) is the probability of having the value b for a generic pixel in the image IM2. In practice, the mutual information function MI(y') provides a measurement of how much it is possible to predict the content of the image IM2 knowing the content of the image IM1, or vice versa. The probabilities p(a,b), p(a) and p(b) are obtained from the pixels histograms.

As in the previous example relative to cross-correlation, also in this case the computer 13 preferably computes the value of the function MI(y') for different values of the mutual rigid lateral displacement y' between the images IM1 and IM2, and determines Y as the mutual rigid lateral displacement y' that gives the maximum value of MI(y').

According to particularly advantageous variants, the computer 13 may compute two or more values of Y using different global merit functions (eventually in combination with different methods for image pre-processing), and then combine the obtained values for Y. The obtained values for Y may be combined for example by computing a mean (arithmetic, geometric or harmonic). Optionally, the mean may be a weighted mean. In this case, a weight for each value of Y may be a measurement of the quality of the alignment of the two images IM1 and IM2 obtained from the merit function used to find that value of Y. For instance, the weight for each value of Y may be the maximum obtained value of the merit function, or the inverse of the mutual rigid lateral displacement with respect to Y for which the merit function is halved.

Once the mutual distance Y between the images IM1 and IM2 is computed as described above, the computer 13 may obtain a measurement of the focus state of the microscope 1 in terms of defocus Δz.

To this purpose, a calibration phase of the microscope 1 is executed, wherein the mutual distance Y1, Y2, . . . Yn is measured between two calibration images IM1c, IM2c of a calibration sample for different positive and negative defocuses values Δz1, Δz2, . . . Δzn of the microscope 1, including the null defocus Δz=0. This calibration phase thus provides a mapping (that, for example, the computer 13 may store as a table) of the defocuses Δz1, Δz2, . . . Δzn of the microscope 1 into the respective values of the distance Y1, Y2, . . . Yn. This advantageously allows the computer 13 to establish the value of Y0 and of the proportionality constant (2·G·NA·Mr) between the difference (Y−Y0) and the defocus Δz.

Therefore, when the sample 4 is inserted into the microscope 1 to be analyzed, the computer 13 preferably starts a focus state measurement phase, during which it measures the distance Y between the images IM1 and IM2 of the sample 4 as described above, and finds the defocus Δz by applying the inverse of equation [1] described above, where the values of the equation coefficients Y0 and (2·G·NA·Mr) are those found during the calibration phase.

The defocus measurement Δz may then be subsequently used to implement an auto-focus mechanism of the microscope 1.

To this aim, the computer 13 may be configured to generate a command signal CS to adjust the distance between the objective 2 and the sample 4 in order to obtain a null defocus Δz and thus optimize the focus state of the image of the sample 4 produced by the microscope 1.

The command signal CS may be received by one or more actuators (not shown in FIG. 1) suitable for moving—according to the command signal CS—the objective 2 and/or the support of the sample 4 (if present) along the optical axis z of the microscope 1, in order to bring the sample 4 as close as possible to the focal plane FP of the objective 2. The actuator may include for instance a piezo-electric translation stage suitable for moving the objective 2 or the support of the sample 4. Alternatively, it is possible to insert lenses with variable focal length in the optical path.

The system for measuring the focus state 6 shows several advantages.

First, it is very fast and allows measuring (and potentially optimizing) the focus state of the microscope 1 substantially instantaneously, since—once the calibration has been executed—a single exposure of the bidimensional photodetector 11 is sufficient to collect a single couple of images IM1 and IM2 of the sample 4 to determine the defocus Δz and, then, the correction to the position of the objective 2 and/or to the support of the sample 4 (if present) along the optical axis z leading to an optimal focus state.

Furthermore, since the system is based on the measurement of the mutual distance Y between the images IM1, IM2 in terms of mutual rigid lateral displacement of the two bidimensional images formed by the rays R1 and R2 coming from two different non-overlapping portions of the exit pupil P, it advantageously provides a measurement of the average focus state of all the field of view of the microscope 1.

The global nature of the measurement makes it advantageously robust against possible aberrations introduced by the sample 4.

Figure 4:
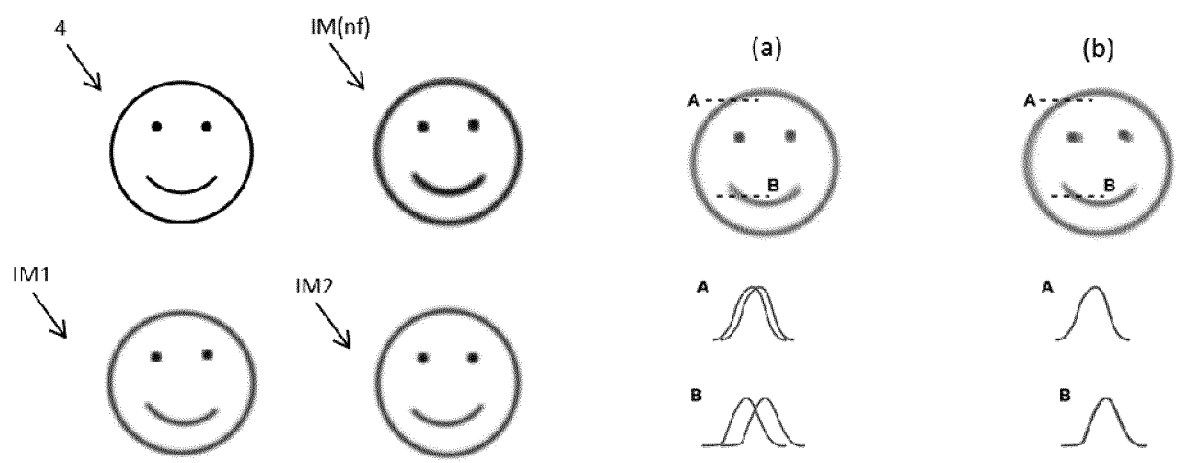
FIG. 4 shows comparative alignment results between bidimensional images, obtained with the system in FIG. 1 and with prior art.

FIG. 4 shows an exemplary sample 4 and one out-of-focus image of said exemplary sample IM(nf). It is assumed that, because of the sample 4, the two images IM1 and IM2 obtained by focusing the rays R1 and R2 coming from two different non-overlapping portions of the pupil P of the objective 2 present some aberrations, different in each image IM1 and IM2. FIG. 4(*a*) shows the alignment between the two images IM1 and IM2 obtained by applying the mutual rigid lateral displacement Y between the two images IM1 and IM2 that maximizes a global merit function of the two images IM1 and IM2. For comparison, FIG. 4(*b*) shows the alignment of the images IM1 and IM2 that would be obtained maximizing a merit function of the electrical signal coming from two linear arrays of photodiodes placed correspondingly to the lines A and B. FIG. 4 also shows the signals provided by the photodiodes placed correspondingly to the lines A and B, for both alignments.

As apparent by comparison of FIGS. 4(*a*) and 4(*b*), the alignment obtained in (a) is globally better than that obtained in (b), despite the alignment along lines A and B is locally worse in (a) than in (b). This happens because in (a) all the information from the images IM1 and IM2 in their entirety is used, providing a greater robustness against 'local' aberrations in the single images IM1 and IM2 introduced by the sample 4.

Furthermore, the global nature of the measurement makes it applicable in conditions of low signal to noise ratio. This happens because the signals S1 and S2 provided by the photodetector 11—i.e. the information content of the images IM1 and IM2—are used in their entirety. The signal to noise ratio is thus intrinsically better with respect to known systems, which use only a part of the information content of the obtained images.

Furthermore, the global nature of the measurement makes it advantageously applicable also in the case of sparse samples. Indeed, since significantly large portions of the field of view of the microscope 1 are used, the chance of having no distinctive and recognizable feature of the sample 4 in the images IM1 and IM2 is advantageously minimized, also in the case when the sample 4 is sparse.

Furthermore, the focus state measurement system 6 is advantageously flexible, in the sense that it may operate in a wide range of numerical apertures and with portions of the pupil P of different dimensions, differently from what happens with known systems using punctual measurements. For example, the two portions of the pupil P used to generate the images IM1 and IM2 may be chosen replacing the mask 12. This advantageously allows to find the best tradeoff between larger portions of the pupil (allowing gathering more light and thus having, for example, a measurement of Y more robust with respect to spherical aberrations) and smaller portions of the pupil (providing longer depth of field and thus a more accurate measurement of Y).

Furthermore, the focus state measurement system 6 allows carrying out the measurement introducing a mutual displacement of the two images IM1 and IM2 not only along the direction y (as shown in FIG. 1), but in general along any direction lying in the plane where the image P' of the exit pupil P is formed.

Finally, the focus state measurement system 6 may be implemented with ordinary optical components, and may be used also in situations where it is necessary to use a specific sensor for image acquisition, e.g. an intensified or electro-multiplied camera.

Although the focus state measurement system 6 comprises a prism 9 deviating rays R1 coming from the first portion of the exit pupil P and leaving the rays R2 coming from the second portion of the exit pupil P unhindered, this shall not be considered as limiting the scope of the present invention.

In general, the focus state measurement system 6 may comprise one or more optical elements configured in a way that, downstream the plane where the pupil image P' is formed, the rays R1 and R2 coming from two different non overlapping portions of the exit pupil P of the objective 2 follows separate optical paths, in order to create two separate bidimensional images of the sample 4 on the plane of at least one photodetector.

Figure 5:
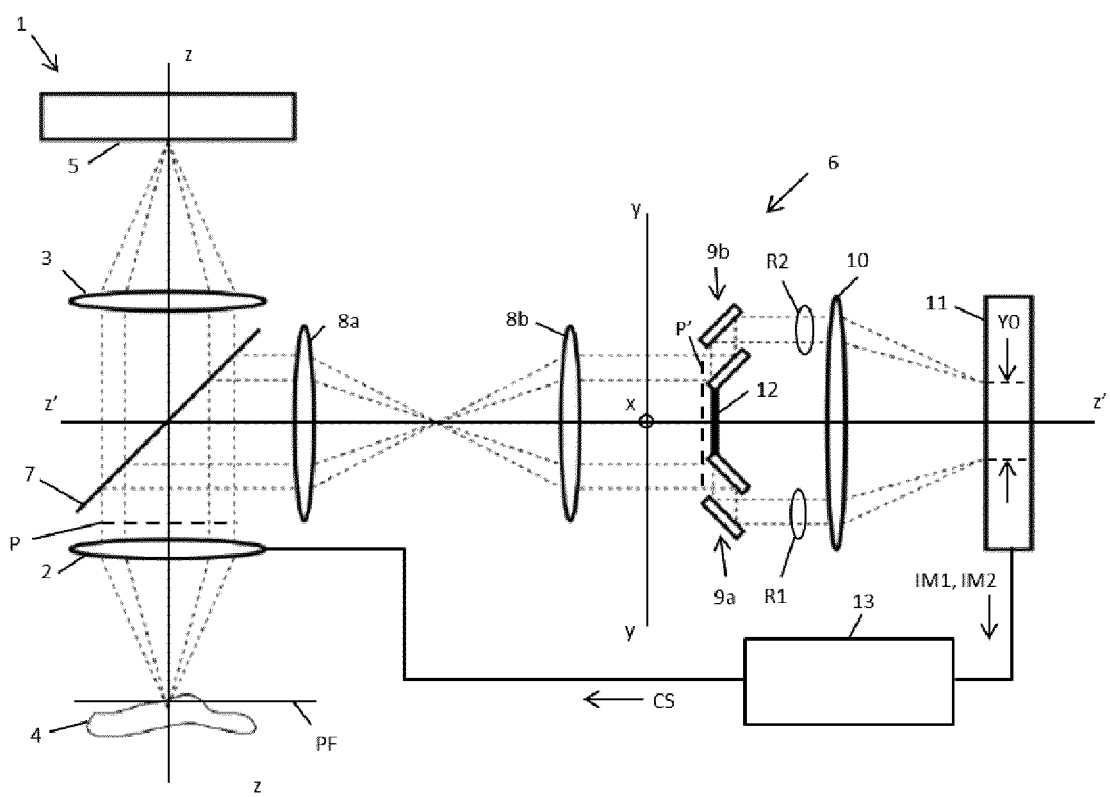
FIG. 5-7 show three systems to measure the focus state of an optical instrument, according to three variants of the present invention.

For example, FIG. 5 shows a focus state measurement system 6 according to a first variant of the embodiment shown in FIG. 1.

The system 6 according to this variant comprises, instead of the prism 9 (i.e. substantially on the plane where the lenses 8*a* and 8*b* form the pupil image P'), two couples of mirrors 9*a* and 9*b*. The first couple of mirrors 9*a* is configured to capture and deviate the rays R1 coming from the first portion of the exit pupil P of the objective 2, whereas the second couple of mirrors 9*b* is configured to capture and deviate the rays R2 coming from the second portions of the exit pupil P. For example, as shown in FIG. 5, each of two couples of mirrors 9*a* and 9*b* may be placed in one of the two complementary half-spaces defined by the optical axis z' and the orthogonal direction x.

Furthermore, the two couples of mirrors 9*a* and 9*b* are configured to deflect the collected rays, respectively R1 and R2, along two separate optical paths, both preferably parallel to the optical axis z'.

Analogously to the embodiment shown in FIG. 1, the rays R1 and R2 are captured by the lens 10, that focuses them into two images, IM1 and IM2 respectively, on the surface of the photodetector 11, which in turn converts them in digital format and sends them to the computer 13 for the determination of the distance Y and of the defocus Δz, according to the above description.

Figure 6:
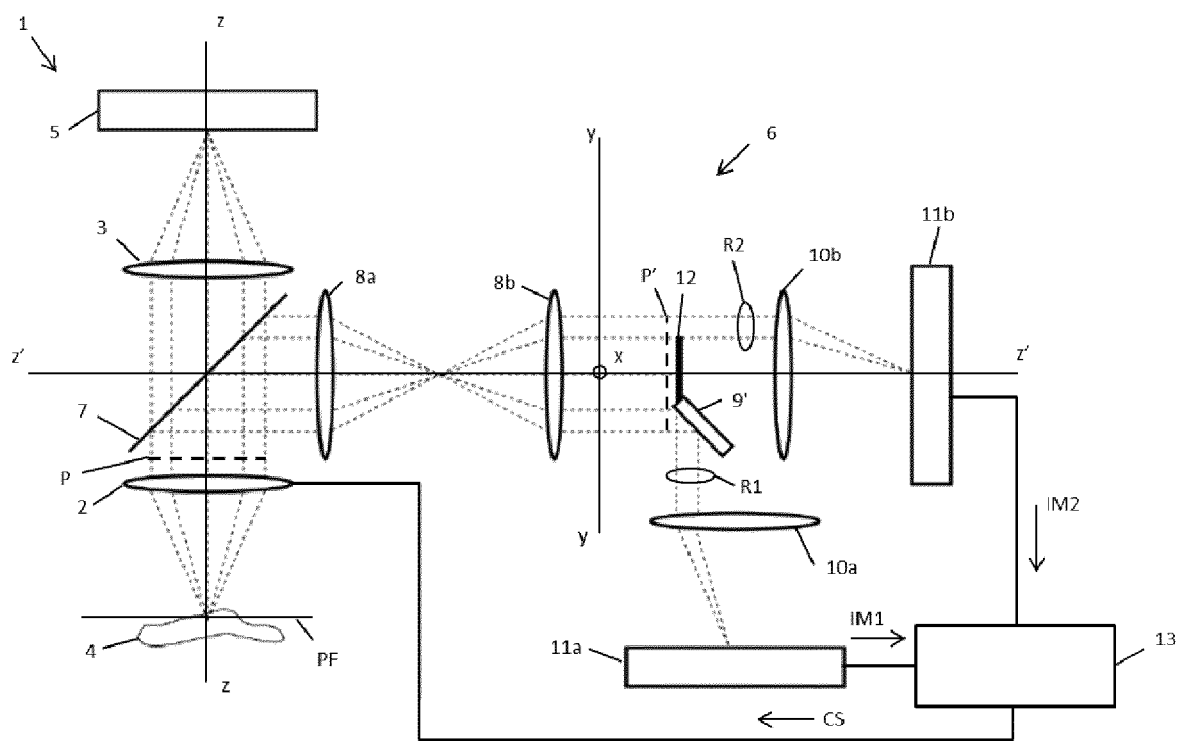

FIG. 6 shows a focus state measurement system 6 according to a second variant of the embodiment shown in FIG. 1.

The system 6 comprises, instead of the prism 9 (i.e. substantially on the plane where the lenses 8a and 8b form the pupil image P'), a mirror 9' suitable for capturing the rays R1 coming from the first portion of the pupil P and for deviating them along a direction different from the optical axis z' along which the unhindered rays R2, coming from the second portion of the pupil P, propagate.

Furthermore, according to this variant, the system 6 comprises two different lenses 10a, 10b placed downstream the mirror 9' and the mask 12 (optional), and two different photodetectors 11a and 11b. The lens 10a is suitable for capturing the rays R1 deviated by the mirror 9' and to focus them onto the surface of the photodetector 11a, in order to form a first bidimensional image IM1 of the sample 4. The lens 10b is instead suitable for capturing the rays R2 (not deviated by the mirror 9') and to focus them onto the surface of the photodetector 11b, in order to form a second bidimensional image IM2 of the sample 4. Each photodetector 11a, 11b preferably converts its respective bidimensional image IM1, IM2 into digital format and sends it to the computer 13. The computer 13 then process the images IM1 and IM2 to determine the distance Y, according to the description above. In this case it should be noted that, since the images IM1 and IM2 are formed on two different photodetectors, their mutual distance Y must be measured with reference to respective reference points (for example, a vertex) identified on each photodetector.

Although in all the variants hitherto shown and described the focus state measurement system 6 is placed between the objective 2 and the tube lens 3 of the microscope 1, this is not restrictive.

In general, in order to convert the defocus Δz into a reciprocal distance Y between the two images IM1 and IM2 obtained by focusing the rays R1 and R2 coming from two non-overlapping portions of the exit pupil P of the objective 2, it is sufficient that the measurement system is placed upstream the exit pupil of the objective 2, for example between the photodetector 5 and the tube lens 3 of the microscope 1. This variant is shown in FIG. 7.

Figure 7:
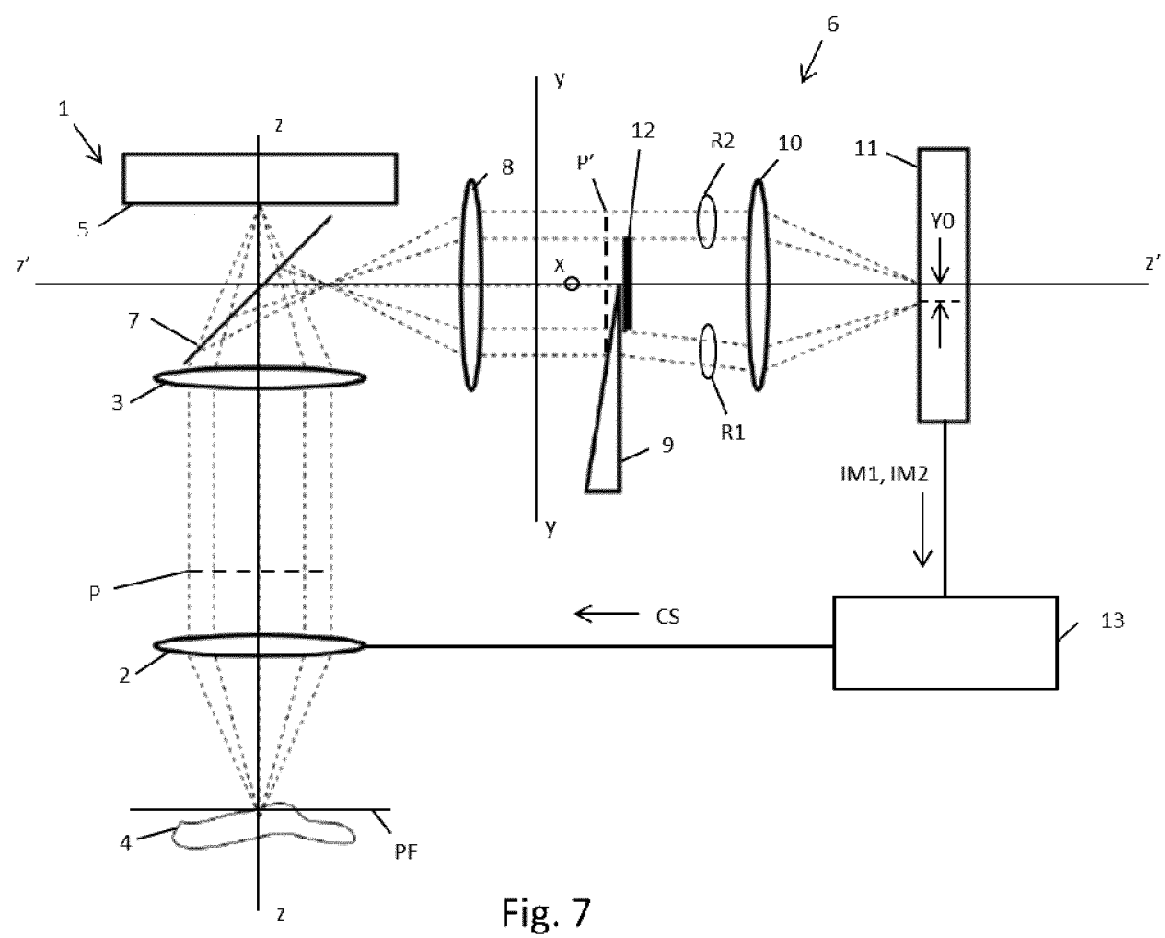

As shown in FIG. 7, the beam splitter 7 catches the light collected by the objective 2 and coming from the sample 4, upstream the tube lens 3. The system 6, according to this variant, comprises a single lens 8, instead of a couple of lenses 8a and 8b. The lens 8 is preferably positioned at a distance from the tube lens 3 equal to the sum of their focal lengths ($f_8+f_{TL}$). Given the positioning of the beam splitter 7 and of the lens 8, an image P' of the pupil of the objective 2 is formed substantially at a distance $f_8$ from the lens 8. Corresponding to the plane where said image of the pupil P' is formed, the prism 9 is placed (possibly together with the mask 12), allowing the extraction of the rays R1 and R2 to form the two images IM1 and IM2, according to the description above.

This variant may be advantageous if, for example, the space between the tube lens and the objective of the microscope 1 is not accessible for mechanical design reasons.

The invention claimed is:
1. A system for measuring a focus state of an optical instrument, said system comprising:

at least one first optical element configured to form an image of an exit pupil of an objective of said optical instrument;

at least one second optical element placed substantially where said image of said exit pupil is formed and configured to deviate at least part of rays coming from said exit pupil so that, downstream said image of said exit pupil, first rays coming from a first portion of said exit pupil and second rays coming from a second portion of said exit pupil follow separate optical paths, said first portion and said second portion of said exit pupil being non overlapping, and are focused into two bidimensional images; and a computer configured to determine a mutual distance between said two bidimensional images as a mutual rigid lateral displacement between said bidimensional images and, based on said mutual distance, to determine a corresponding defocus of said optical instrument, wherein said at least one first optical element comprises a beam splitter positionable upstream said objective of said optical instrument, said beam splitter being configured to capture light coming from said objective and to deviate a portion thereof along an optical axis of said system, said at least one second optical element is configured to capture and deviate away from said optical axis said first rays coming from said first portion of said exit pupil and/or said second rays coming from said second portion of said exit pupil, and said at least one second optical element comprises at least one prism or at least one mirror placed substantially where said image of said exit pupil is formed.

2. The system according to claim 1, wherein said at least one second optical element also comprises a mask placed substantially where said image of said exit pupil is formed, said mask comprising two apertures defining said first portion of said exit pupil from which said first rays come and said second portion of said exit pupil from which said second rays come.

3. The system according to claim 1, wherein said computer is configured to apply to said two bidimensional images a global merit function, providing a measurement of their similarity, and to determine said mutual distance as the mutual rigid lateral displacement between said two bidimensional images which maximizes the value of said global merit function.

4. The system according to claim 3, wherein said global merit function comprises a bidimensional cross-correlation between said bidimensional images or a mutual information function between said two bidimensional images.

5. The system according to claim 3, wherein said computer is configured to determine at least two values of said mutual distance by applying at least two different global merit functions to said two bidimensional images, and to determine a unique value of said mutual distance by combining said at least two values.

6. The system according to claim 1, wherein said computer is configured to determine said defocus of said optical instrument based on said mutual distance by applying an inverse of an equation whose coefficients depend on optical properties of said optical instrument.

7. The system according to claim 1, wherein said computer is configured to generate a command signal based on said determined defocus, said command signal comprising information for adjusting a mutual distance between said objective of said optical instrument and a sample analyzed by said optical instrument, to optimize the focus state of said optical instrument.

8. A method for measuring a focus state of an optical instrument, said method comprising:
- forming an image of an exit pupil of an objective of said optical instrument;
- deviating at least part of rays coming from said exit pupil so that, downstream said image of said exit pupil, first rays coming from a first portion of said exit pupil and second rays coming from a second portion of said exit pupil follow separate optical paths, said first portion and said second portion of said exit pupil being non-overlapping, and are focused into two bidimensional images; and
- determining a mutual distance between said two bidimensional images as a mutual rigid lateral displacement between said two bidimensional images and, based on said mutual distance, determining a corresponding defocus of said optical instrument, wherein
- said forming the image includes capturing light coming from said objective and deviating a portion thereof along an optical axis,
- said deviating the at least part of the rays includes capturing and deviating away from said optical axis said first rays coming from said first portion of said exit pupil and/or said second rays coming from said second portion of said exit pupil, and
- said deviating the at least part of the rays is performed using at least one prism or at least one mirror placed substantially where said image of said exit pupil is formed.

* * * * *